United States Patent [19]

Cowsar et al.

[11] 4,064,086
[45] Dec. 20, 1977

[54] THERMOPLASTIC HYDROGELS

[75] Inventors: Donald Roy Cowsar, Birmingham; Albert Charles Tanquary, Vestavia Hills, both of Ala.

[73] Assignee: National Patent Development Corporation, New York, N.Y.

[21] Appl. No.: 704,888

[22] Filed: July 13, 1976

[51] Int. Cl.² ............................................. C08G 63/08
[52] U.S. Cl. ........................ 260/29.2 R; 260/29.2 N; 260/29.2 E; 260/47 CZ; 260/47 C; 260/77.5 AQ; 260/78 TF; 260/78.3 R; 260/343.6; 560/179; 260/561 B
[58] Field of Search .................... 260/78.3 R, 29.2 R, 260/29.2 N, 29.2 E, 78 TF, 77.5 AQ, 47 CZ, 47 C, 343.6, 484 A, 561 B

[56] References Cited

U.S. PATENT DOCUMENTS

| | | | |
|---|---|---|---|
| 3,169,945 | 2/1965 | Hostettler et al. | 260/78.3 |
| 3,420,798 | 1/1969 | Smith et al. | 260/67 |
| 3,462,398 | 8/1969 | Wagner et al. | 260/78.3 |
| 3,474,062 | 10/1969 | Smith et al. | 260/30.4 |
| 3,515,706 | 6/1970 | Minato et al. | 260/85.5 |
| 3,607,841 | 9/1971 | Nakahara et al. | 260/78.3 |

FOREIGN PATENT DOCUMENTS 1,231,163   4/1960   France.

*Primary Examiner*—Harold D. Anderson
*Assistant Examiner*—E. A. Nielsen
*Attorney, Agent, or Firm*—Cushman, Darby & Cushman

[57] ABSTRACT

Thermoplastic hydrogels are prepared by making condensation polymers of spirolactones of the formula:

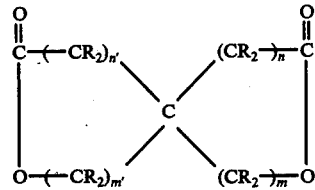

with a difunctional compound capable of opening the lactone rings. The thermoplastic hydrogels can be cross-linked. In the formula the total of $n$ and $m$ and also of $n'$ and $m'$ is 2 to 5 and the R groups are H or hydrocarbyl with not over 3 R groups being hydrocarbyl. Most preferably all R groups are H and $n$, $m$, $n'$ and $m'$ are all 1.

40 Claims, No Drawings

THERMOPLASTIC HYDROGELS

The present invention relates to novel thermoplastic hydrogel forming polymers.

The addition polymerization of a dilactone and a diamine to form a hydroxyl-containing polyamide has been known since 1957 and has been studied by several groups of workers, principally in Japan, but there is no evidence in the literature that a thermoplastic cross-linked or cross-linkable polyamide hydrogel was ever made or contemplated.

The first polymerization was reported by Iwakura et al, Nippon Kagaku Zasshi 78, 746 (1957); C.A. 54 5448 (1960), who investigated the reactions of α-angelica lactone and bi(α-angelica lactone). Bi(α-angelica lactone) and tetramethylenediamine in m-cresol at 140° C gave an insoluble reddish brown polymer. Similar polymers were obtained with the dilactone and octamethylenediamine in dichlorobenzene. No properties of the polymers were given in chemical abstracts.

In 1969, a melt-spinnable hydroxyl-containing polyamide was reported in a Japanese patent, Hachihama et al, Japan 8842, October 1, 1969; C.A. 54, 7729 (1960). The polymer was made by the reaction of hexamethylenediamine and the dilactone of γ,γ'-dihydroxysebacic acid in refluxing ethanol or m-cresol.

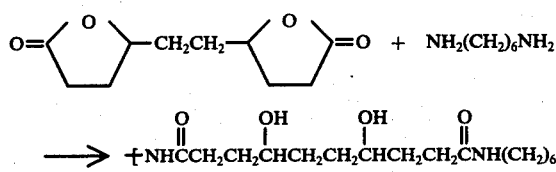

The product from ethanol had a melting point of 177°–179° C and an intrinsic viscosity of 0.18, while that from cresol had a melting point of 165°–170° C and an intrinsic viscosity of 0.51. Both were insoluble in water, alcohol, and ether. The polyamide fibers were reported to be dye receptive and hydrophilic.

Iwakura et al, Makromol. Chem. 95, 228 (1966) prepared a variety of polyamides from a dilactone made from a diepoxide. The diglycidyl ether of hydroquinone was first treated with ethyl thioglycolate. The addition product was then hydrolyzed to the hydroxy acid which cyclized to the lactone.

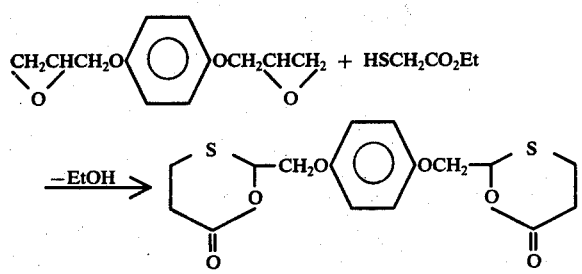

Reaction of the dilactone with tetramethylenediamine, hexamethylenediamine, nonamethylenediamine, and m-xylylenediamine produced polyamides with viscosities of 0.15 to 0.38 and with melting points below 110° C.

Derivatives of hydroquinone were used by Nakabayashi and Cassidy, J. Polymer Sci. A-1, 7, 1275 (1969), to prepare redox polyamides.

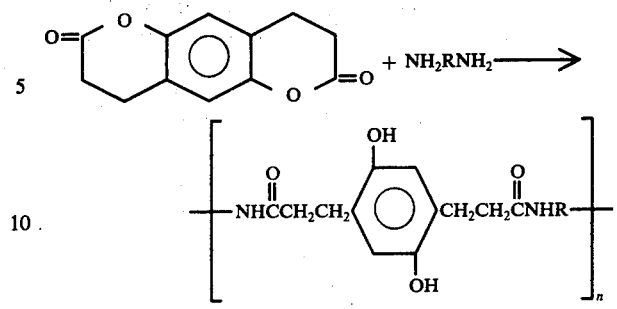

The polymerizations were carried out by heating mixtures of the dilactone and various diamines in dimethylacetamide. The recovered polymers, of low viscosity, were rapidly oxidized on exposure to air to insoluble products.

Iwabuchi et al, J. Polymer Sci. A-1, 9, 3405 (1971) attempted to obtain more tractable polymers by employing the 2,5-dimethyl dilactone. These polymers were also of low viscosity, but both the reduced and the oxidized polymers were soluble in solvents for nylons.

Cornand and Govaert, Mededel. Konink. Vlaam. Acad. Wetenschap Belg., Kl. Wetenschap, 16, No. 14, (1954); C.A. 50, 4109d (1956) treated 3,3-bis(bromomethyl) oxetane with sodium cyanide to obtain the dinitrile, hydrolyzed the dinitrile to the sodium salt of the dicarboxylic acid, and acidified the salt to obtain 4,4'-spirobibutyrolactone. A modification of the procedure is the substitution of 3,3-bis(chloromethyl)oxetane (BCMO) for the 3,3-bis(bromomethyl)oxetane.

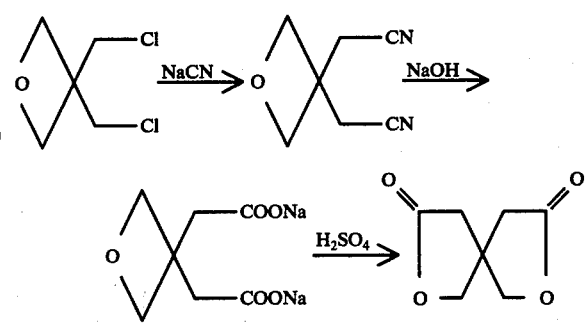

BCMO was treated with excess sodium cyanide in refluxing ethanol. The dinitrile, bis(cyanomethyl) oxetane, was isolated by simply filtering the hot alcohol solution to remove inorganic salts and cooling the solution to effect crystallization of the product. The dinitrile intermediate was heated for several hours in 4 N sodium hydroxide, the resulting solution was adjusted to pH 2 with concentrated sulfuric acid, and heating was continued overnight to effect lactonization. Upon cooling the solution, the dilactone precipitated as fluffy white crystals, mp 214°–215° C. The crude product was recrystallized from p-dioxane to give pure 4,4'-spirobibutyrolactone, mp 216° C.

SUMMARY OF THE INVENTION

The invention concerns the preparation of thermoplastic polymeric hydrogels as well as cross-linked polymers therefrom. Not only are the thermoplastic polymers hydrophilic in nature but also the cross-linked polymers, but to a lesser degree.

Briefly, the thermoplastic polymeric hydrogels can be prepared by reacting a spirolactone (I) with a difunctional compound capable of ring-opening the spirolactone.

The spirolactone is characterized by the following structural formula:

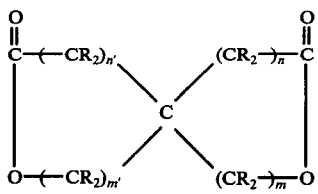

wherein each R variable is hydrogen or hydrocarbyl, preferably hydrogen or alkyl of 1 to 4 carbon atoms, and preferably still hydrogen; with the proviso that no more than three (3) R variables are substituents other than hydrogen and the total of $n$ and $m$ is 2 to 5 and $n'$ and $m'$ is 2 to 5. Most preferably $n$, $m$, $n'$ and $m'$ are 1 and all R groups are H. When R is hydrocarbyl, it is preferably lower alkyl, e.g. of 1 to 4 carbon atoms, most preferably methyl or ethyl.

The difunctional compound is characterized by at least two active hydrogen-containing groups which can be primary amino, secondary amino, alcoholic hydroxyl, phenolic hydroxyl, or mixtures thereof.

The resulting thermoplastic polymeric hydrogel is characterized by the units designated by (II) and (III) below:

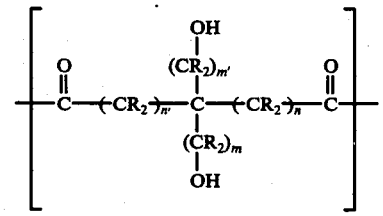 II.

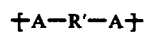 III.

wherein R' is a divalent radical, e.g., alkylene alkylidene, cycloalkylene, arylene including mono- and polyaromatic ring (e.g. phenyl and napthyl rings) structures which can be bridged rings or fused rings, divalent heterocyclic radicals (aliphatic and cyclic) and the like; and wherein each A variable represents the oxy group (—O—), the primary amino group:

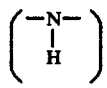

or the secondary amino group:

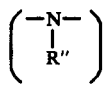

where R" is alkyl, aryl, cycloalkyl.

Varying degrees of cross-linking of the thermoplastic polymeric hydrogel primarily through the pendant hydroxy groups can be effected by reacting such pendant hydroxy groups with a polyfunctional compound, e.g. aliphatic and aromatic polyisocyanates, aliphatic and aromatic polycarboxylic acids, and various other compounds which contain two or more functional groups capable of reacting with alcoholic hydroxyl groups.

While the preferred spirolactone is malonic acid bis(2-hydroxyethyl) dilactone also called 4,4'-spirobibutyrolactone and having the formula:

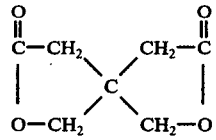

there can also be used, for example, malonic acid bis (hydroxymethyl) dilactone, 5,5'-spirobisvalerolactone, 6,6'-spirobiscaprolactone, 7,7'-spirobisenantholactone, malonic acid 2-hydroxyethyl 2-hydroxypropyl dilactone, malonic acid 2-hydroxyethyl 2-hydroxybutyl dilactone, malonic acid bis(2-hydroxypropyl) dilactone, malonic acid bis (2-hydroxybutyl) dilactone, malonic acid bis (2-hydroxyhexyl) dilactone.

Examples of difunctional compounds having at least two active hydrogen containing groups are ethylene diamine, propylene diamine, trimethylene diamine, tetramethylene diamine, hexamethylene diamine, octamethylene diamine, nonomethylene diamine, decamethylene diamine, dodecomethylene dimaine, octamethylene diamine, xylylylene diamine, m-phenylene diamine, p-phenylene diamine, piperazine, 4,4-ethylenedipiperazine, N,N'-dimethylethylene diamine, 2-(methylamino) ethylamine, 1-methyl-2,4-diaminobenzene (toluene diamine), 3,3'-dimethyl-4,4'-biphenyldiamine, 4,4'-dimainodiphenyl, oxydianiline, methylenedianiline, 1,4-cyclohexanedianine, 1,3-cyclohexanediamine, 1-methyl-2,4 cyclohexanediamine, amino alcohols of the formula $HO(CH_2)_nNH_2$ where $n$ is 2 to 10, e.g. ethanolamine, 1-hydroxy-3-aminopropane, 1-hydroxy-4-amino butane, 1-hydroxy-6-aminohexane and 1-hydroxy-10-aminodicane, 1-2-methyl-1-hydroxy-2-aminoethane, N-methylethanolamine, N-methylisopropanol amine, p-aminophenethyl alcohol, p-amino-alpha-methylbenzyl alcohol, 4-aminocyclohexanol, toluene-2,6-diamine,1,5-naphthalenediamine, 1,8-naphthalenedimaine, meta-xylylenediamine, para-xylylenediamine, benzidine, 3,3'-dimethyl-4,4'-biphenyldiamine, 3,3-dimethoxy-4,4'-methylenedianiline, 4,4'-ethylenedianiline, 2,3, 5,6-tetramethyl-para-phenylenediamine, 2,5-fluorenediamine, and 2,7-fluorenediamine; cycloaliphatic diamines like 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis-(3-aminopropyl)piperazine, diols such as ethylene glycol, propylene glycols, butylene glycol, trimethylene glycol, tetramethylene glycol, hexamethylene glycol, decamethylene glycol, dodecamethylene glycol, octamethylene glycol, diethylene glycol, triethylene, tetraethylene glycol, dipropylene glycol, tripropylene glycol, 2,2-dimethyl-1,3-propanediol, 2,2-diethyl-1,3-propanediol, 3-methyl-1,5-pentanediol, N-methyldiethanolamine, 1,3-cyclohexanediol, 1,4-cyclohexanediol, 4,4-methylenebiscyclohexanol, 4,4'-isopropylidenegiscyclohexanol 1,4-xylylyeneglycol, 1,4-cyclohexane dimethanol, 1,3-xylylene glycol, 4-hydroxymethyl phenethyl alcohol, 4- hydroxymetyl phenylpropanol, 1,4-phenylediethanol, 1,3-phenylenediethanol, 1,4-piperazinediethanol, resorcinol, hydroquinone, 4,4'-methylenebisphenol, 3,3'-methylenebisphenol, 4,4'-isopropylidenebisphenol, 1,8-naphthanediol, 1,5-naphthalenediol, di(4-hydroxy-3-methylphenyl) dimethyl methane, di(p-hydroxyphenyl) methyl methane, di(p-hydroxyphenyl)methyl ethyl methane, di(4-hydroxy-3-methylphenyl) methane, di(4-hydroxyphenyl) sulfone, di(4-hydroxyphenyl) sulfoxide 1, tetrachlorobisphenol A, tetrabromobisphenol A, di(4-hydroxyphenyl) ether, p,p'-dihydroxydiphenyl and methanediol.

Examples of cross linking agents are toluene 2, 4-diisocyanate, toluene 2,6-diisocyanate, m-benzenediisocyanate, p-benzene diisocyanate, 4-methoxy-1, 3-phenylene diisocyanate, 4-chloro-1, 3-phenylene diisocyanate, 4-isopropyl-1,3-phenylene diisocyanate, 4-ethoxy-1,3-phenylene diisocyanate, 2,4'-diisocyanatodiphenyl ether, 4,4'-diisocyanodiphenyl ether, 4,4'-diisocyanatodiphenyl methane, mesitylene diisocynate durylene diisocyanate, benzendine diisocynate, o-nitrobenzidine diisocyanate, 4,4'-diisocyanatodibenzyl, 1,5-naphthalene diisocyanate, ethhlene diisocyanate, tetramethylene diisocyanate hexamethylene diisocyanate, decamethylene diisocyanate, dodecamethylene diisocycnate, 3,3'-bitolylene-4,4'-diisocyanate, tritolylmethane triisocyanate, Mondur CB (toluene diisocyanate-trimethylol propane reaction product with an NCO/OH ratio of 2:1), 2,4,4'-triisocyanatodiphenyl ether, toluene, 2,4,6-triisocyanate, oxalic acid, succinic acid, glutaric acid adipic acid, suberic acid, pimelic acid, sebacic acid, maleic acid, maleic anhydride, fumeric acid, tricarbylic acid, o-phthalic acid, phthalic anhydride, terephthalic acid, isophthalic acid, trimellitic acid, trimellitic anhydride, pyromellitic acid, pyromellitic anhydride, benzolphenone-4,4'-dicarboxylic acid and citric acid, 2,2,2-tris(aminomethyl) ethanol, dimethylolurea, trimethylol melamine, hexamethylol melamine and other polymethylol amines and amides, diethylene triamine, triaminobenzene or other triamines or higher functional amines.

The thermoplastic polymers of the present invention have the same uses as the solvent polymers in Shepherd U.S. Pat. No. 3,618,213, Nov. 9, 1971 and Shepherd U.S. Pat. No. 3,577,518, May 4, 1971 and the cross-linked polymers have the same uses as the cross-linked polymers in said Shepherd U.S. Pat. No. 3,617,213 and the polymers in Wichterle U.S. Pat. No. 3,220,920, Nov. 30, 1965. The entire disclosure of the Shepherd patents and the Wichterle patent are hereby incorporated by reference and relied upon. The water soluble polymers can be used in the same manner as those shown in Gould U.S. Pat. No. 3,576,760, Apr. 27, 1971.

The polymers of the invention whether cross-linked or not are hydrophilic and in the presence of water, form hydrogels. Among the advantages which are obtained by the novel polymers include (i) up to 25% and more water uptake, i.e. based on the weight of polymer and water; (ii) molded articles such as fibers made from such polymers exhibit better dye receptivity; (iii) fibers from such polymers exhibit a compatible feel to the skin; (iv) the polymers exhibit a better biocompatibility than nylon (this feature is of importance since a preferred embodiment involve the reaction of a spirolactone with a diamine to give novel polyamides); (v) the novel polyamides are reversible (this feature is advantageous in thermoforming operations); (vi) the novel polymerization reaction results in novel polycondensation polymers which exhibit shrinkage; however, upon cross-linking the same, e.g., 1,6-hexamethylene diisocyanate, expansion of the polymers is observed, this feature is advantageous in molding operations where one wishes to obtain the intricate details of the mold; (vii) the novel polymers, e.g., polyamides, can be extruded over a wide range, for instance about 150° to 180° C; (viii) thermoforming operations, e.g., injection molding, extrusion, etc., of the polymers can be accomplished without excluding the normal moisture present in an ambient atmosphere; on the other hand, conventional polyamides must be processed under anhydrous conditions.

The water uptake of the resulting polyamides and polyesters will vary with the chain length of the diamine or diol, e.g.:

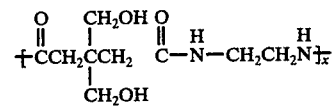

water soluble

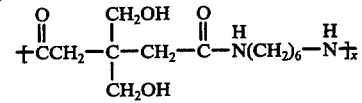

20% water pick up $x$ is the number of units in the polymer.

$$\text{Water pick-up} = \frac{100\% \times \text{weight(wet)} - \text{Weight(dry)}}{\text{Weight(wet)}}$$

Heat pressed samples of hyrophilic cross-linked polymers according to the invention which had a water uptake value of twenty percent also had mechanical properties comparable to the properties of medical grade Silastic in the dry state and swelling and mechanical properties which are only slightly affected by pH, salt content, temperature, or thermal treatment. Only moderate and scattered tissue reaction was observed upon implantation of the polymer.

In the case of reacting IV with a diamine, the polymerization reaction is the following:

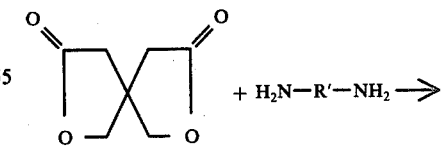

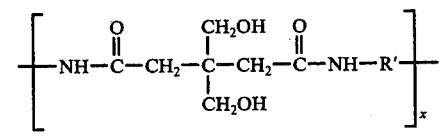

The presence of the hydroxyl groups provides hydrophilicity and solubility in either water or polar organic solvents depending on the length or nature of the R' in the diamine. However, unlike most hydroxyl-containing polymers, which dehydrate before melting, these new polyamides are thermoplastic resins.

It was found that the normally water-soluble polyamides (e.g. when R' is ethylene, propylene or water swellable, when R' is hexametylene, for example) can be converted to nonionic hydrogels by cross-linking them via reaction of the hydroxyl groups with diisocyanates. For example a tough, transparent water-swellable film was obtained by adding a few drops of 1,6-hexanediisocyanate to a DMF (dimethyl formamide) solution of the hexamethylenediamine-derived polyamide, casting a film from the solution, and subsequently heating the film at 100° C to effect curing. A similar DMF solution on addition of 4,4'-methylene-bis(-phenylisocyanate) gelled rapidly. Extraction of the DMF from the gel with water resulted in a hydrogel.

Very importantly and quite surprisingly, we have found that these crosslinked hydrogels behave as thermoplatics; that is, they can be melted and molded into various shapes. In this behavior, they differ from any known hydrogel, or for that matter from any currently available covalently crosslinked material. This property results from chain scissioning on melting followed by reformation of amide linkages on cooling.

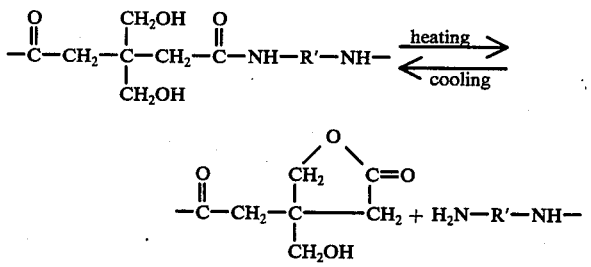

In general in the past, crosslinking must be carried out after the polymeric material has been formed into the desired shape, because crosslinking irreversibly alters the material and severely limits its subsequent processability. If it were not for this limitation, crosslinking would prove much more widely applicable, especially for improving the resilience of materials having otherwise excellent properties.

Polyamides, as a class, offer exceptional toughness and strength, but the hydrophilic polyamides, unless crosslinked, exhibit poor resiliency, due to plasticization by water. Nylon 4 fibers, for example are usually limp and rubbery when wet; but when crosslinked, the fibers approach the resiliency of wool and silk, which are crosslinked proteins. The crosslinking of nylon 4 must be carried out after the fiber is formed because the crosslinked resin cannot be melted or dissolved for spinning.

Even uncrosslinked, most polyamides that exhibit substantial water absorption cannot be fabricated by conventional melt processes, such as extrusion and injection molding. The reason for this is that the chain linkages or pendant groups which are responsible for water absorption promote high interchain attractions, and these attractions must be overcome by high processing temperatures which cause degradation before the polymer will melt or flow. Consequently these moisture-sorptive polyamides must be plasticized before melting or must be fabricated by solution processes. As examples, nylon 2 (polyglycine), proteins, and other polyamides of α-amino acids char on heating; nylon 3 (poly-β-alanine) reverts to acrylamide before melting; and the polyazetidinones (substituted nylon 3's) degrade on melting. All must therefore be converted to fibers, films, and other shapes by solution processes, which are not applicable to injection molding or the extrusion of thick sections. The polyamides of dicarboxylic acids and diamines present similar problems when the amide content is sufficient to promote water absorption. Moreover, the methods by which these moisture-sorptive polyamides are made are not suitable for the casting of monomers to form polymers in molds.

Previous workers, recognizing the potential utility, have sought to prepare moisture-sorptive thermoplastic polyamides by a variety of approaches. One involved the grafting of polyethyleneoxide to a polyamide, but the graft polymer became water soluble before substantial water absorption could be achieved. Another involved the use of polyether diamines, but these also generated water-soluble polymers, which has to be crosslinked for most applications. The most promising approach has involved the treatment of a polyamide with acrylic acid to form an N-carboxyethyl product and then crosslinking the modified polyamide with divalent metal ions to form an ionically crosslinked (ionomeric) nylon. When the degree of N-alkylation is low, the product is thermoplastic but the water absorption is low. As the degree of N-alkylation increases, the material becomes increasingly difficult to melt fabricate; and at high degrees of modification, the product is unstable in the presence of alkali metal ions, which exchange with the polyamide and render it water-soluble.

Attempts made to find other thermally reversible crosslinking means have met limited success, and the best of these approaches have been poorly applicable to the polyamides. One approach, for example, has involved incorporating a phenol pendant group in a polymer chain and crosslinking the polymer with a diisocyanate. The phenyl urethane thus formed reverts to isocyanate and phenol on heating. But a phenolic monomer interferes in most syntheses of polyamides.

The utility of water-sorptive polyamides would therefore be enhanced if they could be more easily processed. Particularly desirable would be a crosslinked polyamide that could be molded and extruded, but no acceptable means of achieving thermoplasticity of a crosslinked polyamide material has heretofore been found.

According to the invention as pointed out above there are provided novel polyamides having the desired processing characteristics as discussed above.

The new polyamides furthermore have the beneficial properties of both polyamides and the known hydrogels such as those of the Shepherd and Wichterle patents set forth above.

Also as pointed out above the invention provides novel thermally reversible polymer chain linkages which scission on heating and reform on cooling to permit a crosslinked resin to melt and flow.

The invention also provides such chain linkages in uncrosslinked polymers to permit substantial improvements in the melt-flow characteristics of highly-polar polyamides, thereby avoiding irreversible thermal degradation.

In another modification of the invention, the dilactone and a triamine, such as diethylenetriamine, may be combined in a mole ratio of about 1:1 to form a polyamide which contains recurring imino linkages, which can react with diepoxides, diisocyanates, diacyl halides, or diacrylates to form crosslinks. Similar products can be formed using triethylenetetramine or tetraethylenepentamine in place of diethylene triamine.

The polyamides and polyesters of the present invention may be made by a number of different specific processes and routes.

For example, the polymerization may be carried out in solution or melt. Any solvent which dissolves the reactants and does not react with the dilactone or diamine (or diol) may be used, and suitable solvents include alcohols, amides, sulfones, ethers, ketones, hydrocarbons, halogenated hydrocarbons, and the like. Water may also be used but is usually less desirable because it generally causes low-molecular-weight polymers to form.

The preferred solvents are the aprotic water-miscible liquids, such as tetrahydrofuran and dimethylformamide, which are solvents for both the reactants and the uncrosslinked polymers. These solvents do not react with isocyanate crosslinking agents, and are readily extracted from a crosslinked polyamide by water washing. Other solvents include methyl alcohol, ethyl alcohol, isopropyl alcohol, butyl alcohol, dimethyl sulfone, dipropyl ether, dimethyl acetamide, acetone, methyl ethyl ketone, benzene, toluene, xylene, hexane, dichloroethylene, ethylene dichloride, methylene chloride.

When solvents are used, the solvent may be present in the mixture as a minor component, i.e., just enough to dissolve the monomers and increase fluidity, or as a major component, e. g. 90% or more by weight. Solution polymerization may be effected over a broad temperature range, from below room temperature to above 200° C, depending on the volatility of the solvent and monomers and the thermal stability of the polymer. However, since high temperatures may require the use of pressure reactors, and since chain scissioning competes with chain formation at high temperatures, the preferred temperature range is ambient, i.e. about 20° C to 150° C, and the most preferred is ambient to 100° C.

An uncrosslinked polyamide which has been prepared in this manner may be isolated by precipitating the polymer or by evaporating the solvent from the solution. The polymerization of 4,4-spirobibutyrolactone and hexamethylenediamine in alcohol (ethyl alcohol) for example, yields an alcoholic solution of polymer from which the polymer can be isolated by addition of acetone to precipitate the polymer, or by evaporation of the alcohol. The polymer may then be dissolved in dimethylformamide, and a diisocyanate e.g. hexamethylene diisocyanate, may be added to the solution to effect crosslinking. If on the other hand an aprotic solvent is used, the diisocyanate (such as any of those set forth supra) may be added directly to the polymerizing mixture. In that case, an excess of diamine may be used to form an amine-terminated polymer, which then reacts with the diisocyanate to form both urea linkages (chain linkages) and urethane linkages (crosslinking).

Such a crosslinked polyamide, or one prepared in solution by an alternative means, may be isolated by water extraction to remove solvent.

When the polymerization is carried out in a melt, the monomers may be added as solids to a reactor, and the mixture is then melted and stirred. The operable temperature range depends on the melting points and volatilities of the monomers, and may be from ambient temperatures (about 20° C.) to above 200° C. The preferred temperature range for most dilactones and diamines is 100° to 150° C, and the preferred pressure range is atmospheric to about 30 psi.

Triamines or polyamines of higher functionality may be included with the monomers so that the molten polymer on cooling forms the crosslinked polyamide. Alternatively the polyamide may first be made by melt polymerization and then treated in the melt with a diisocyanate, or the polyamide may be recovered and dissolved in a solvent before addition of a diisocyanate.

In any case, the molten polymer may be removed from the reactor by conventional means, as by pouring the melt from the reactor or by pumping the melt through a die to form shaped elements, such as rods, tubes, films, or filaments. The rods may of course be chopped into pellets which are convenient for extrusion or molding, or the rods or other forms can be ground into powders.

Alternatively, the melt polymerization may be carried out in molds, or carried out continuously be pumping the molten reactants through a continuous reactor, such as an extruder.

The time of reaction is not critical, since the reaction proceeds rapidly as soon as the reactants are melted together or dissolved in a solvent. Polymerization thus occurs within minutes and can yield a polymer of infinite molecular weight if a crosslinking agent is added. However, the best results are obtained if the dilactone and diamine are permitted to react over a period of 1 to 4 hours, and preferably 1 to 2 hours, to insure formation of long polyamide chains.

Obviously the polymerizations can be carried out in the presence of various useful additives, such as pigments, dyes, reinforcing fillers, biologically active agents, and plasticizers. A nonreactive biologically active agent, such as a therapeutic drug, may thus be encapsulated in the polyamide or polyester or a reactive agent may be bound to the polymer chain, to control bioavailability; and a plasticizer, such a glycerol, may serve as a solvent for the polymerization and later by incorporation in the crosslinked polyamide. A typical drug is penacillin. There can also be used any of the drugs set forth in Gould U.S. Pat. No. 3,576,760, Apr. 1971, the entire disclosure of which is hereby incorporated by reference and relied upon.

If desired, the polyamides may be further modified by chemical treatments, as, for example, by use of acrylonitrile to effect cyanoethylation or chloroacetic acid to effect carboxymethylation.

The discovery of the thermal reversibility of amide formation in the reaction of lactone and amine is broadly applicable to the preparation of other useful crosslinked and uncrosslinked polymers. For example, a lactone-terminated polyamide may be prepared by polymerization of a diamine with an excess of dilactone, and the lactone-terminated polyamide may then be combined with an amine-terminated polyurea to form a semi-crystalline block polymer of high strength. Conversely, an amine-terminated bis-amide which has been prepared by the polymerization of one mole of dilactone with two moles of diamine may undergo interfacial polymerization with a diacid halide, e.g adipoyl chloride, sebacoyl chloride, etc. to form an alternating copolymer.

Depending upon the reactants used and the molecular weights of the products, the polyamides may range from liquids or soft tacky solids to strong rubbers or hard plastics. The polyamides are useful as coatings, adhesives, binders, sealants, gaskets, encapsulating resins, films, fibers, tubing and molded articles. They are converted into hydrogels upon contact with water.

DESCRIPTION OF THE PREFERRED EMBODIMENTS

EXAMPLE 1

The multi-step synthesis of 4,4'-spirobibutryolactone was carried out in two reaction series. The intermediate, 3,3-bis(cyanomethyl) oxetane, was from the first series and the 4,4'-spirobibutryolactone was isolated from the second series.

A (REACTION SERIES ONE)

Tribromoneopentyl alcohol, 975 g (3.0 mole), was added to a solution of 217 g (3.3 moles) of potassium hydroxide pellets in 100 ml of water and 1000 ml of methanol. The mixture was heated to refluxing with stirring overnight (18 hours) after which it was cooled to room temperature and 1000 ml of cold water was added. Stirring was stopped and the mixture was allowed to separate into two phases. The aqueous alcohol phase (top layer) was decanted and discarded. The remaining heavy oil, 740 g, was crude 3,3-bis(bromomethyl) oxetane.

To the oil was added 1000 ml of 95% ethanol and 455 g (6.6 moles) of sodium cyanide. The mixture was heated to reflux with stirring for 36 hours and then filtered while hot to remove the sodium bromide by-product. The ethanol solution was cooled in an ice water bath to effect crystallization of the product. The first crop (110.7 g) of crude 3,3-bis(cyanomethyl) oxetane was collected by filtering. The filtrate was evaporated in vacuo and the soluble part of the solid residue was taken up in 1000 ml of boiling benzene. The hot benzene solution was treated with 5 grams of decolorizing carbon, filtered, and cooled to effect crystallization of the second crop of product. The second crop (79.5 g) of 3,3-bis(cyanomethyl) oxetane was collected by filtering and combined with the first crop. The total yield of buff-colored platelets was 190.2 g, 46.6% of theory.

B (REACTION SERIES TWO)

Bis(cyanomethyl) oxetane, 343.5 g (2.5 moles), was added to a solution of 220 g (5.5 moles) of sodium hydroxide in 1200 ml of water and the mixture was heated at 80° C with stirring for 48 hours. Ammonia gas was evolved during the reaction and when the gas could no longer be detected with wet test paper, hydrolysis was assumed to be complete.

The solution was acidified with about 210 ml of concentrated sulfuric acid to adjust the value of pH to 2. The acidified mixture was heated at 80° to 90° C with stirring overnight (15 hours). The reaction mixture was then cooled slowly (with stirring) to about 15° C to effect crystallization of the product. The crude product, 268 g, was collected by filtering, washed with ice water and air dried. The crude product was recrystallized once from 500 ml of p-dioxane to give 234.8 g of white crystals, mp 208°–9° C by capillary melting point technique and 216° C by DSC. The yield of pure 4,4'-spirobibutyrolactone was 62.5% of theory based on crude 3,3-bis(cyanomethyl) oxetane and 29% overall based on tribromoneopentyl alcohol.

PREPARATION AND CHARACTERIZATION OF A SERIES OF HYDROPHILIC POLYAMIDES

When 4,4'-spirobibutyrolactone was slowly heated in a test tube with equimolar portions of primary diamines, exothermic addition reactions occurred yielding viscous polymer melts.

The polymers prepared by this simple technique were generally of low molecular weight, with inherent viscosities in the range of 0.03 to 0.11 dl/g (at 0.5 g/dl in DMF).

To increase the molecular weight (inherent viscosity) of the polymers, several melt polymerizations of equimolar amounts of 4,4'-spirobibutyrolactone and hexamethylenediamine were carried out in which the heating rate and temperature were varied over a wide range. The highest inherent viscosity that obtained by the technique of melt polymerization at atmospheric pressure was 0.086 dl/g. When 4,4'-spirobibutyrolactone was polymerized with ethylenediamine and with dodecamethylenediamine in equimolar amounts by melt polymerization procedures, the highest inherent viscosities of the polymers were 0.048 dl/g for poly[ethylene 3,3-bis(hydroxymethyl) glutaramide] and 0.104 dl/g for poly[dodecamethylene 3,3-bis(hydroxymethyl) glutaramide].

There were also investigated techniques for carrying out the polymerization of 4,4'-spirobibutyrolactone and hexamethylenediamine in solution. By heating at refluxing a solution containing a concentration of 30% of solids (monomers) in DMF there was obtained poly[hexamethylene 3,3-bis(hydroxymethyl) glutaramide] having an inherent viscosity of 0.05 dl/g. In a similar experiment using absolute ethanol as a solvent, there was obtained poly[hexamethylene 3,3-bis(hydroxymethyl) glutaramide] having a viscosity of 0.067 dl/g. Equimolar amounts of lactone and diamine were employed in these experiments.

There were also employed techniques of polymerizing in sealed tubes at high temperatures that consistently gave polymer inherent viscosities higher than those obtained by the previous methods. Equimolar amounts of 4,4'-spirobibutyrolactone and diamine were mixed thoroughly and placed in heavy-walled glass tubes. The tubes were sealed with a flame and placed in an oven at 240°–250° C for approximately 14 hours. This procedure was used to prepare poly[hexamethylene 3,3-bis(hydroxymethyl) glutaramide] having an inherent viscosity of 0.095 dl/g, poly[dodecamethylene 3,3-bis (hydroxymethyl) glutaramide] having an inherent viscosity of 0.20 dl/g, poly[m-xylylene 3,3-bis(hydroxymethyl) glutaramide] having an inherent viscosity of 0.086 dl/g, and poly[piperazine 3,3-bis(hydroxymethyl) glutaramide] having an inherent viscosity of 0.05 dl/g. Approximately ten sealed-tube polymerizations were carried out to prepare quantities of poly[dodecamethylene 3,3-bis(hydroxymethyl) glutaramide] on a scale as large as 50g per batch. The procedure consistently yielded polymers having inherent viscosities in the range of from 0.20 to 0.25 dl/g (at 1 g/dl in DMF).

The unique properties of the novel hydrophilic polyamides are primarily due to two factors: the extremely high degree of interchain hydrogen bonding contributed by the pendant hydroxyl and chain amide groups, and the thermal reversibility of the polymer-forming reaction. The uncrosslinked polymers prepared by the sealed-tube polymerization method were characterized in a series of evaluations to determine their solubility, solvent sensitivity, water absorption, and thermal transitions.

All of the polymers prepared from 4,4'-spirobibutyrolactone and the various diamines were amorphous, transparent, glassy, slightly yellow resins. The polyamides made from hexamethylene diamine, m-xylylenediamine, and piperazine were hard and brittle at room temperature and soft in the range of from 75 to 95° C. The polyamide derived from dodecamethylenediamine was very tough and elastic at room temperature, and even more elastic at temperatures slightly above 30° C.

The solubility and solvent sensitivity of the uncrosslinked polyamides were determined qualitatively by placing small pieces of the polymers on a microscope slide, adding a few drops of solvent, and observing the polymer-solvent interaction through a microscope. The solvents investigated were water, DMF, acetone, DMSO, ethanol, formic acid, heptane, benzene, methylene chloride, and carbon tetrachloride. The polymer-solvent interactions are summarized in Table I. All of the polyamides were affected by polar solvents but unaffected by non-polar solvents.

The water uptake of uncrosslinked polymers prepared in the manner just described from hexamethylenediamine, m-xylylenediamine, and piperazine could not be measured, since they were all soluble in water, but the water uptake of five films of uncrosslinked poly[dodecamethylene 3,3-bis(hydroxymethyl) glutaramide] was found to be 38.8% of their dry weight. These films were transparent when dry, and cloudy or opaque when saturated with water.

As previously pointed out, the crosslinked polymers were also thermoplastic.

hours. The polymerizate was allowed to cool slowly to room temperature and a second sample was removed for a final viscosity determination. The inherent viscosity was found to be 0.104 dl/g in DMF.

EXAMPLE 3

PREPARATION OF POLY[HEXAMETHYLENE 3,3-BIS (HYDROXYMETHYL)-GLUTARAMIDE] BY SOLUTION POLYMERIZATION 4,4'-Spriobibutyrolactone, 1.56 g (0.10 mole), was placed in a small flask equipped with a magnetic stirrer, condenser, thermometer, and septum stopper. Then, 5.3 g of a solution of 15.68% of hexamethylenediamine (HMDA) in absolute ethanol (0.84 g of HMDA, 72% of stoichiometric amount) was added with a syringe. The mixture was heated to 53° C at which point the spirolactone dissolved. The mixture was stirred for 2 hours at 50° C then 0.90 g more of 15.68% of HMDA in ethanol (total 0.98 of HMDA, 84% of stoichiometric amount) was added. The mixture was stirred for 1 hour with no apparent viscosity increase; then additions of 0.27, 0.37, 0.19, and 0.19 g of the HMDA/ethanol slution were made at 45-min intervals. The total HMDA that had been added was 1.14 g (98.5% of stoichiometric amount) and the solution still did not appear viscous. The mixture was then heated to refluxing and left refluxing over night (14 hours). Then, 0.13 g more of the HMDA/ethanol solution was added for a total of 1.16 g of HMDA (100% of theory). Refluxing was continued for 2 hours more during which time the solution viscosity seemed to increase slightly. A sample of the solution was removed and the ethanol was evaporated in vacuo

Table I.

| | Polymer Solubility and Solvent Sensitivity | | | |
|---|---|---|---|---|
| | Polyamides Derived from 4,4'-Spirobibutyrolactone and | | | |
| Solvent | Hexamethylene-diamine | Dodecamethylene-diamine | m-Xylylene-diamine | Piperazine |
| Water | soluble | softens | partially soluble | soluble |
| DMF (dimethyl formamide) | soluble | soluble | soluble | soluble |
| Acetone | insoluble | softens | insoluble | insoluble |
| DMSO (dimethyl sulfoxide) | soluble | soluble | soluble | soluble |
| Ethanol | soluble | soluble | soluble | softens |
| Formic Acid | soluble | soluble | soluble | soluble |
| Heptane | insoluble | insoluble | insoluble | insoluble |
| Benzene | insoluble | insoluble | insoluble | insoluble |
| Methylene-chloride | soluble | softens | softens | softens |
| Carbon Tetra-chloride | insoluble | insoluble | insoluble | insoluble |

EXAMPLE 2

PREPARATION OF POLY[DODECAMETHYLENE 3,3-BIS (HYDROXYMETHYL)-GLUTARAMIDE] BY MELT POLYMERIZATION 4,4'-Spriobibutyrolactone,1.56 g (0.010 mole), was mixed with 2.00 g (0.010 mole) of dodecamethylenediamine in a miniature stirred resin flask. The polymerizate was heated slowly to 100° C (45 min) then held at 107°–112° C with stirring for 1.5 hours. During that time, the polymerizate had become viscous. The temperature was then increased slowly (1.5 hours) to 156° C, and after 2 hours more, the polymerizate was cooled to room temperature, a sample was removed, and the inherent viscosity was determined. The inherent viscosity was found to be 0.095 dl/g at 1 dl/g in DMF. The polymerizate was then reheated slowly (1.5 hours) to 175° C and held at that temperature with stirring for 2 leaving a residue of a hard polymer. The inherent viscosity of the polymer was determined to be 0.067 dl/g in DMF.

EXAMPLE 4

PREPARATION OF POLY[DODECAMETHYLENE 3, 3-BIS (HYDROXYMETHYL)-GLUTARAMIDE] BY THE SEALED-TUBE METHOD 4,4'-Spirobibutyrolactone, 15.61 g (0.10 mole), and 20.01 g (0.10 mole) of dodecamethylenediamine were thoroughly mixed with a mortar and pestle and placed inside a heavy-walled glass tube. The top of the tube was sealed with a torch flame, the sealed tube was inserted into a section of steel pipe, and the entire assembly was placed in an oven at 250° C overnight. After 14 hours the tube was removed from the oven and allowed to cool slowly to room temperature. The resulting polymer was an almost colorless, transparent, resilient resin that could be poured from the tube when heated to about 125° C. The inherent viscosity of the polymer was determined to be 0.22 dl/g in DMF. A single determination of the elemental composition of the polymerizate showed 68.61% of carbon, 10.15% of hydrogen, 8.29% of nitrogen, and 12.95% of oxygen. The theoretical composition of the polyamide is 64.01% of carbon, 10.18% of hydrogen, 7.86% of nitrogen and 17.95% of oxygen.

EXAMPLE 5

PREPARATION OF POLY[HEXAMETHYLENE 3,3-BIS (HYDROXYMETHYL)-GLUTARAMIDE] BY THE SEALED-TUBE METHOD

To 1.56 g (0.10 mole) of 4,4'spirobibutyrolactone contained in a small heavy-walled glass tube was added 1.16 g (0.01 mole) of freshly distilled hexamethylenediamine. The contents of the tube were warmed slightly until a clear viscous polymerizate resulted. The tube was rotated for several minutes to effect good mixing and then sealed with a torch flame. The tube was inserted in a small stainless-steel bomb and placed in the oven at 250° C overnight. After 15 hours the polymerizate was removed from the oven and allowed to cool slowly to room temperature. The polymer mass was a clear, slightly yellow, brittle resin. Granular samples of the polymer were removed by boring holes in the mass with an electric drill. The inherent viscosity of the polymer was determined to be 0.095 dl/g in DMF.

EXAMPLE 6

PREPARATION OF POLY[HEXAMETHYLENE 3,3-BIS (HYDROXYMETHYL)-GLUTARAMIDE] BY THE SEALED-TUBE METHOD

To 2.34 g (0.015 mole) of 4,4'-spirobibutyrolactone in a heavy-walled glass tube was added 2.04 g (0.15 mole) of freshly distilled m-xylylenediamine. The tube was sealed with a torch flame, inserted in a stainless-steel bomb, and placed in an oven at 250° C overnight. After 15 hours, the tube was removed from the oven and allowed to cool slowly to room temperature. The polymer was a transparent, amorphous, brittle mass that could be easily granulated with an electric drill. The inherent viscosity of the polymer was found to be 0.086 dl/g in DMF.

EXAMPLE 7

PREPARATION OF POLY[PIPERAZINE 3,3-BIS (HYDROXYMETHYL)-GLUTARAMIDE] BY THE SEALED TUBE METHOD

To 2.34 (0.015 mole) of Lb 4,4'-spirobibutyrolactone in a heavy-walled glass tube was added 1.29 g (0.015 mole) of freshly distilled piperazine. The tube was sealed with a torch flame, sealed in a stainless-steel bomb, and heated in the oven at 250° C overnight. After 14 hours the polymerizate was allowed to cool slowly to room temperature. The polymer was a dark orange-colored brittle resin. The color was probably due to a small amount of piperazine decomposition. The inherent viscosity was determined to be 0.05 dl/g in DMF.

The polymer made from 4,4'-spirobibutyrolactone and dodecamethylenediamine was found to be a hydrophilic polyamide with promising properties even though the samples were of relatively low molecular weight. The uncross-linked polymer was an extremely tough and elastic plastic. Strips of fibers of the polymer that had been elongated several fold would slowly recover to their original lengths when released. The hydrophilic polymer had a water uptake of about 40%.

PREPARATION OF CROSSLINKED RESINS

As pointed out above, the hydrophilic polyamides prepared from 4,4'-spirobibutyrolactone could be covalently crosslinked via the hydroxyl groups by treating them in DMF solution with a diisocyanate to form urethane linkages. The crosslinking of poly[dodecamethylene 3,3-bis(hydroxymethyl) glutaramide] with hexamethylene diisocyanate and 4,4'-methylenebis(phenylisocyanate) is illustrated below.

Crosslinked resins were made by adding 5 and 10 mole % of hexamethylenediisocyanate to solutions of the polymer in DMF. The mixtures were stirred well and placed in an oven at 95° C for approximately 2 hours. The resulting gels were "precipitated" in water in a high-speed blender and then washed repeatedly with water. The resulting pea-sized pieces of the crosslinked resins were dried at 90° C in a vacuum oven and stored in a desiccator. One batch of crosslinked resin was similarly prepared with 5 mole % of 4,4'-methylenebis(phenylisocyanate).

Most of the characterizations of the crosslinked polymers were carried out on film specimens that were prepared by melt pressing the materials.

The average water uptakes of film specimens (5 each) made from resins crosslinked with 5 and 10 mole % of hexamethylenediisocyanate were 31.5% and 22.5% respectively (Samples 1 and 3 in Table II).

TENSILE PROPERTIES AND HYDROLYTIC STABILITY

Tensile strength, elongation at break, and modulus were determined on various microtensile film specimens of the cross linked resins that had various compositions and pre-treatments prior to evaluation. These pre-treatments were designed to test the effects of crosslink density, immersion in water, heat cycling (i.e., repetitive melt processing), and prolonged exposure at 40° C to water and buffered solutions of pH 4 and pH 8. Table II shows the values obtained.

The first series of samples was crosslinked with 5 mole % of hexamethylenediisocyanate, HMDI; the second series was crosslinked with 5% of 4,4'-methylenebis (phenylisocyanate), MBPI, and the third group was cross-linked with 10% HMDI. The values of tensile strength, modulus, and elongation for the untreated samples in each series quantitatively reflect the effect of increased crosslinking. With increased crosslinking, the polymers become stronger, stiffer, and harder and have lower elongations. Samples crosslinked with 15 and 20% of HMDI were prepared and while not brittle, they were quite hard. The samples crosslinked with 5% HMDI have lower values of modulus than those crosslinked with 5% MBPI. The 5% MBPI sample would be expected to have a higher mositure uptake and a higher modulus than a sample prepared with 10% HMDI.

As was expected, the wet tensile strength of the polymer, as shown for the 10% HMDI crosslinked sample, is considerably lower than the dry tensile strength. A similar reduction in modulus is also observed but not in elongation. The water uptake of the sample that was tested wet was about 22.5 weight %.

The hydrolytic stability of the crosslinked polymers is indicated from the entries in the table which show the effects of soaking samples in water and buffered solutions of pH 4 and 8 at 40° C. They indicate the following points.

Table II

Tensile Properties of Crosslinked Poly[dodecamethylene-3,3-bis(hydroxymethyl)glutaramide]

| Sample Series | Composition | Pre-treatment | Tensile strength, psi | Tensile modulus, psi | Elongation at break % |
|---|---|---|---|---|---|
| 1. | 5 mole % HHDI[a] | none | 260 | 130 | 920 |
| 2. | 5 mole % MBPI[b] | none | 820 | 400 | 700 |
| 3. | 10 mole % HMDI | none | 1450 | 235 | 620 |
| 4. | 10 mole % HMDI | water saturated | 130 | 90 | 500 |
| 5. | 5 mole % HMDI | water at 40° C for 96 hr | 190 | 120 | 880 |
| 6. | 10 mole % HMDI | water at 40° C for 190 hr | 1600 | 400 | 610 |
| 7. | 5 mole % HMDI | pH 4 at 40° C for 96 hr | 50 | 150 | 730 |
| 8. | 10 mole % HMDI | pH 4 at 40° C for 190 hr | 880 | 480 | 420 |
| 9. | 5 mole % HMDI | pH 8 at 40° C for 96 hr | 450 | 170 | 640 |
| 10. | 10 mole % HMDI | pH 8 at 40° C for 190 hr | 1600 | 440 | 440 |
| 11. | 10 mole % HMDI | three thermal processing cycles | 1320 | 370 | 560 |
| 12. | 10 mole % HMDI | three thermal cycles (water sat.) | 140 | 90 | 410 |

[a]HMDI is hexamethylenediisocyanate
[b]MBPI is 4,4'-methylenebis(phenylisocyanate)

Given a certain level of cross linking density, as in the case of the 10% HMDI crosslinked sample, water soaking has little effect on tensile strength and elongation and no effect on modulus. The slightly higher tensile strength and lower elongation may reflect extraction of residual monomers which were acting as plasticizers. On the other hand, the 5% HMDI crosslinked sample showed a marked decrease in tensile strength, possibly due to extraction of polymer or plasticization.

The samples exposed to pH 4 show marked reductions in tensile strength accompanied by a lesser change in modulus and elongation. This indicates susceptibility to acid hydrolysis. From the fact that the reduction was much higher in the case of the 5% crosslinked sample, the amide linkage, which is beta to a hydroxyl, may be especially susceptible to acid hydrolysis. If the urethane linkage were the weak point of the network, a more substantial decrease in the tensile strength of the 10% crosslinked sample would probably have been observed.

Exposure to pH 8 is not as detrimental. The 10% crosslinked sample showed a general hardening as indicated by the slightly increased tensile strength, the marked increase in tensile modulus, and a considerable reduction in elongation.

The last two entries in the table indicate the thermal stability of the 10% HMDI crosslinked sample. When the samples were prepared for this phase of the study, they were subjected to three 15-min press cycles at 150° C. Although the shear was not severe, the ability of the material to withstand a lengthy thermal exposure is demonstrated by the small decrease in tensile strength and elongation and the slight increase in modulus of dry samples. The wet samples showed no change in modulus, a small increase in tensile strength, and a small reduction in elongation.

THERMAL PROCESSABILITY OF THE CROSSLINKED RESINS

Films of the crosslinked polymers were prepared by pressing the dry polymer in a closed cylindrical mold at 4000 psi and 100° C to form void-free discs about 3 mm in thickness and about 25 mm in diameter. The discs were then pressed between Teflon (polytetrafluoroethylene) sheets at 6000 lb pressure and 180° C to form films of the desired thickness.

EFFECT OF AUTOCLAVING (STEAM STERILIZATION)

One of the utilities for thermoplastic hydrogels is their use as biomedical materials. Accordingly a brief evaluation of the effect of steam autoclaving on the dimensional stability of film specimens made from poly[dodecamethylene 3,3-bis(hydroxymethyl)glutaramide] that had been crosslinked with 5 and 10 mole % of HMDI was carried out. It was found that supported films from resins having both degrees of crosslinking were stable to autoclaving at 120° C. However, unsupported films of the 5 mole % crosslinked material distorted badly and fused during steam autoclaving. Unsupported films of 10 mole % crosslinked material underwent steam autoclaving without dimensional change or distortion providing all internal stresses had been relieved by pressing the specimens at a sufficiently high temperature initially.

EXAMPLE 8

Approximately sixty sterilized discs were prepared as follows: Poly[dodecamethylene 3,3-bis(hydroxymethyl) glutaramide], inherent viscosity 0.23 dl/g, as a 33% solution in DMF was crosslinked by adding to it 10 mole % of hexamethylenediisocyanate and heating at 90° C for 2 hours. The crosslinked polymer gel was "precipitated" in cold water in a blender and then subjected to six 5- to 10-min washings in boiling water while still stirring at high speed in the blender. The washed polymer was in the form of highly swollen pea-sized pieces during the hot-water washing. The crosslinked resin was dried overnight in vacuo at 90° C and the dried polymer was pressed in a closed mold at 4000 psi and 100° C to form void-free discs about 3-mm thickness and 25-mm diameter. The large discs were then formed into 1-mm thick films by pressing between Teflon plates at 6000 pounds and 180° C. The films were backed with 1-mil-tick Teflon film and then steam sterilized at 120° C and 15 psi for 15 min. The implant specimens (5-mm diameter by 1-mm thickness) were then cut from the sterilized films with a punch and placed in bags and heat sealed. The bagged discs were further sterilized by 6 Mrad irradiation with a Cobalt-60 source.

EXAMPLE 9

Four small tubular specimens were prepared from the same resin as the sterile discs of Example 8 by first thermoforming a thin film about 3- to 4-mils thick, wrapping the film several layers thick around a small Teflon mandrel, and then heating the polymer to fuse the layers into a tube. The tubes were then sealed in bags and sterilized by 6 Mrad irradiation with a Cobalt-60 source.

EXAMPLE 10

Equimolar portions of 4,4'-spirobibutyrolactone and dodecamethylenediamine were mixed thoroughly with a mortar and pestle and placed in a large test tube. The tube was placed in a sealed stainless-steel bomb and heated overnight at 250° C. After 14 hours the polymerizate was allowed to cool slowly to room temperature. The test tube containing the polymer was wrapped with a heating tape and the polymer was heated to the temperature at which it would flow (ca 140° C) and was poured slowly in a thin ribbon onto a Teflon coated pan. The polymer, 57.3 g, inherent viscosity 0.24 dl/g in DMF, was cut into pieces with scissors and placed in the container.

EXAMPLE 11

CROSSLINKED POLY[DODECAMETHYLENE 3,3-BIS (HYDROXYMETHYL)-GLUTARAMIDE]

Thirty grams of poly[dodecamethylene 3,3-bis (hydroxymethyl)-glutaramide], inherent viscosity 0.2 dl/g, was dissolved in 60 ml of DMF and 1.41 g (10 mole %) of hexamethylenediisocyanate was stirred in. The mixture was heated at 95° C for 2 hours and then allowed to cool to room temperature. The cross-linked gel was "precipitated" in 500 ml of cold water in a blender, washed with four 500 ml portions of warm water, and dried overnight in vacuo at 90° C. The dry crosslinked resin was ground into a powder by mixing it with a small amount of dry ice and stirring it for 30 min in a high-speed blender. The powdered resin, 29.6 g, was then bottled.

A glass tube was also coated with a film of uncrosslinked poly[dodecamethylene 3,3-bis(hydroxymethyl) glutaramide] to give a hydrophilic coating.

In the following examples the uncrosslinked polymer employed was the poly[dodecamethylene 3,3-bis (hydroxymethyl)-glutaramide] prepared in Example 4 and hereinafter called Polymer 1 and the crosslinked polymer (hereinafter called Polymer 2) was the polymer prepared in Example 8 using hexamethylene diisocyanate as the crosslinking agent.

Crude Polymer 1 was amorphous, transparent and a slightly yellow powder.

Polymer 2 was an amorphous slightly yellow powder.

Heat pressed films from both Polymer 1 and 2 were yellow, elastic and tough.

The solubility properties of the uncrosslinked Polymer 1 were evaluated by adding 0.25 grams of the powder to 2.25 g of well stirred solvent at room temperature - the test was repeated with a series of solvents of varying polarity.

Results — As shown in Table III, the material is soluble in polar solvents (alcohols, DMSO) but unaffected by nonpolar solvents (hydrocarbons). These solubility properties are the result of the high degree of interchain hydrogen bonding typical of amide polymers.

TABLE III

| Solubility of Uncrosslinked Polymer (Polymer 1) | | |
|---|---|---|
| | Solvents | Description |
| Alcohols | Ethanol | Soluble |
| | (95%) Ethanol | Soluble |
| | Cyclohexanol | Soluble |
| | Methyl Cellosolve | Soluble |
| | Morpholine | Soluble |
| | Methanol | Soluble |
| | Isopropyl alcohol | Soluble |
| | Sec-butanol | Soluble |
| Ether/Amine | Dioxane | Softens |
| | Tetrahydrofuran | Softens |
| | Pyridine | Soluble |
| Acid | Formic Acid | Soluble |
| Aromatic | Toluene | Softens |
| Acetates | Butyl acetate | Softens |
| Aprotic Solvents | DMSO | Soluble |
| | DMF | Soluble |
| Carbonyl | Acetone | Softens |
| Hydrocarbons | Carbon tetrachloride | Insoluble |
| | heptane | Insoluble |
| | Water | Softens |

The reduced and intrinsic viscosity of crude and heat pressed Polymer 1 were measured in dimethylformamide (DMF).

These viscosity values show the following;
1. The molecular weight is low ($[\eta] = 0.3$ dl/gram),
2. The intrinsic viscosity is the same for crude and heat pressed uncrosslinked polymer ($[\eta] = 0.32$ for dl/g for crude; $[\eta] = 0.33$ dl/g for heat pressed). This indicates that thermal processing does not alter the molecular weight of the uncrosslinked polymer.

THERMOPLASTIC PROCESSABILITY

Melt flow characteristics of Polymer 1 and Polymer 2 were evaluated using the following types of apparatus:

A. Melting point apparatus. The samples were introduced into a standard glass apparatus for melting point determination.

B. A Carver press. Using a Carver press at different temperatures and pressures, the range of molding compression conditions was determined in a cylindrical mold. (Fred S. Carver Hydrolic Equipment, Catalogue Number 2090; I.D. 1⅛ inches).

C. Extrusion Plastometer.

RESULTS

A. MELTING CHARACTERISTICS — Using a melting point apparatus, signs of melting for the uncrosslinked material were detected in the 140°–148° C range while the crosslinked polyamide melted in the range 187° C to 193° C.

B. COMPRESSION MOLDING — Both crosslinked and uncrosslinked material could be compression molded and heat sealed between 100° C and 180° C and pressures between 1000 and 5000 psi. These samples were flexible, yellow and transparent.

C. EXTRUSION — The tests on the Extrusion Plastometer show that the uncrosslinked powder can be extruded at 200° C and a pressure of 44 psi, while the crosslinked polymer needs higher pressures (750 psi) to flow at 200° C. Thus both materials can be extruded with conventional equipment.

EVALUATION OF THE PROPERTIES OF THERMALLY PROCESSED MATERIALS

A. HYDROPHILICITY — Water uptake is used as a measure of degree of hydrophilicity. The procedures for determining the water uptake of hydrogels is set forth above. The samples were strips (25 mm × 6 mm × 2 mm). In order to gather information on the swelling properties of the crosslinked material, all measurements were performed on Polymer 2 using crosslinked poly(hydroxyethyl methacrylate) (Type NL) samples as a control. The control is called hereinafter crosslinked poly(HEMA).

1. SALT SENSITIVITY — The water uptake was determined as a function of salt concentration (0–3.4% sodium chloride solution).

RESULTS — The results of the above test are summarized in Table IV.

TABLE IV

Effect of Salt Level on the Water Uptake of Heat Pressed Crosslinked Polyamide (Polymer 2) and Crosslinked poly(HEMA)

| Swelling Condition | Water Uptake (%) | Ext (%)[a,b] |
|---|---|---|
| Heat Treated Polymer 2 | | |
| 0.0% NaCl | 19.9 | 1.1 |
| 0.9% NaCl | 18.6 | 1.2 |
| 3.5% NaCl | 19.5 | .8 |
| Crosslinked Poly(HEMA) | | |
| 0.0 % NaCl | 58.9 | 0.9 |
| 0.9 % NaCl | 56.0 | 0.6 |
| 3.5 % NaCl | 48.3 | — |

[a]The apparent lower extractable values shown in Table IV for salt water are an artifact resulting from the use of salt water. During redrying the swollen film, residual salt is deposited, giving rise to an apparent decrease in extractables.
[b]The extractables in Tables IV to X are based on polymer weight.

These results indicate that:
 a. The water uptake of Polymer 2 was 19.9 percent in deionized water;
 b. The water uptake level of the heat pressed crosslinked samples (10 mole percent crosslinking agent) decreased from 20 to 16.5% as the salt level increased from zero to 3.5%. These values are about one-third of those obtained with the control samples;
 c. As shown in Table IV, heat pressed Polymer 2 is slightly less salt sensitive than bulk polymerized crosslinked poly(HEMA).

2. TEMPERATURE EFFECT — The effect of the swelling temperature on the water uptake of the crosslinked polyamide and the crosslinked poly(HEMA) was determined.

RESULTS — The results are detailed in Table V. The indicated that no significant effect of the swelling medium on the water uptake can be detected between 20° and 37° C for Polymer 2 or crosslinked bulk poly(HEMA).

TABLE V

Effect Of Temperature On The Water Uptake And Extractable Level Of Heat Pressed Crosslinked Polyamide Polymer 2 And Crosslinked Poly(HEMA) Type NL

| Temperature | Water Uptake (%) | Extractables (%) |
|---|---|---|
| HEAT TREATED POLYMER 2 | | |
| 20° C | 22.5 | 2.2 |
| 23° C | 22.7 | 2.0 |
| 37° C | 22.8 | 2.2 |
| CROSSLINKED POLY(HEMA) TYPE NL | | |
| 20° C | 56.2 | .3 |
| 23° C | 56.2 | .3 |
| 37° C | 54.7 | .3 |

Higher molding conditions were used than for the samples used for Table IV.

3. pH SENSITIVITY — Description: Polymer 2 and crosslinked poly(HEMA) Type NL were hydrated in solutions of various pH's (4, 7, 4, and 8) for one week at 23° C. This study gives an assessment of the resistance of the amide linkage to hydrolysis. Extreme acid (pH=2) and basic conditions (pH=11) were also used in this test.

TABLE VI

EFFECT OF pH ON THE WATER UPTAKE OF HEAT PRESSED CROSSLINKED POLYAMIDE POLYMER 2 AND CROSSLINKED POLY(HEMA) TYPE NL

| pH | WATER UPTAKE (%) | EXTRACTABLES (%) |
|---|---|---|
| HEAT TREATED POLYMER 2 | | |
| 2 | 33.3 | 1.5 |
| 4 | 17.5 | .1 |
| 7.4 | 17.4 | 1.1 |
| 8 | 18.6 | 1.1 |
| 11 | 105.8 | 2.4 |
| CROSSLINKED POLY(HEMA) TYPE NL | | |
| 2 | 61.1 | .8 |
| 4 | 64.5 | — |
| 7.4 | 56.0 | .3 |
| 8 | 65.1 | 1.0 |
| 11 | 74.8 | .6 |

RESULTS — The data given in Table VI shows that the water uptake remained constant between pH=4 to 8. Based on previous experience with the effect of hydrolysis on the swelling properties, one can assume that the material was hydrolytically stable at pH 4, 7.4, and 8. Crosslinked poly(HEMA) Type NL exhibits a slight pH effect.

With crosslinked poly(HEMA) Type NL increasing the concentration of methacrylic acid units in the polymer (at pH ≧ 7) resulted in corresponding increase in water uptake under conditions of moderate pH. Thus, the pH stability between 4 and 8 of Polymer 2 is better than the crosslinked poly(HEMA).

Extreme acid (pH=2) and base conditions (pH=11) did however cause a partial amide linkage hydrolysis resulting in a higher swelling level. Similar swelling increases at extreme conditions were also found for crosslinked poly(HMEA).

4. THERMAL CYCLING EFFECT — the water uptake were determined after one-hour thermal treatment (100° and 140° C)

TABLE VII

Effect of a One-Hour Thermal Treatment on the Water Uptake and Extractables Level of the Heat Pressed Crosslinked Polyamide

| Temperature | Water Uptake (%) | Extractable (%) |
|---|---|---|
| Control (Room temperature) | 17.6 | 1.5 |
| 100° C | 18.0 | 1.3 |
| 140° C | 17.7 | 1.4 |

RESULTS — The results given in Table VII show that the swelling characteristics of Polymer 2 are the same as those known for crosslinked poly(HEMA) type L at these temperatures.

5. STERILIZATION — Supported and unsupported H-2 strips were autoclaved at 15 psi and a temperature of 121° C for 15 minutes. Samples were also gas sterilized. Gamma irradiation was also used to sterilize the heat pressed crosslinked polyamide.

RESULTS — The heat pressed Polymer 2 softened upon autoclaving and therefore autoclaving could not be used to sterilize this particular polymer.

No visible change was observed after gas or radiation sterilization.

6. WATER VAPOR ABSORPTION — The water absorption of dry heat pressed Polymer 2 was measured at 40 percent and 80 percent relative humidity and a temperature of 20° C.

TABLE VIII
EFFECT OF RELATIVE HUMIDITY ON THE WATER UPTAKE OF CROSSLINKED POLYAMIDE (POLYMER 2) AND CROSSLINKED POLY(HEMA) TYPE NL

|  | POLYMER 2 (%) | CROSSLINKED POLY(HEMA) |
|---|---|---|
| 40% RH | 6.4 | 2.5 |
| 80% RH | 18.7 | 10.2 |

RESULTS — As shown in Table VIII, the polymer absorbed water vapor in the range of 6 to 19%, which was slightly higher than the values (3-10%) observed for crosslinked poly(HMEA) type NL. Earlier studies on poly(HEMA) showed that no relationship exists between the amount of water vapor absorbed and the water uptake.

7. EFFECT OF COMPRESSION MOLDING ON SWELLING PROPERTIES — The water uptake of the heat pressed Polymer 2 were determined at temperatures of 100° to 140° C and a pressure of 5000 psi for 5 minutes. The refractive index was determined using known procedures.

TABLE IX
EFFECT OF COMPRESSION MOLDING TEMPERATURE ON THE WATER UPTAKE IN DEIONIZED WATER AND EXTRACTABLE LEVEL OF HEAT PRESSED CROSSLINKED POLYAMIDE (POLYMER 2)

|  | WATER UPTAKE (%) | EXTRACTABLE (%) |
|---|---|---|
| 100° C | 17.5 | 1.4 |
| 140° C | 19.5 | 2.8 |

RESULTS — These water uptake measurements show that:

a. Heat-pressed samples at 140° C have higher water uptake values and more extractables than those heat pressed at 100° C (Table IX)

b. Swelling characteristics, extractable level and opacity can be well controlled by defining the molding conditions or the range of 100° or 140° C, as shown in Table X.

TABLE X
EFFECT OF CONSTANT COMPRESSION MOLDING CONDITIONS[1] ON THE WATER UPTAKE IN DEIONIZED WATER AND EXTRACTABLE LEVEL OF HEAT PRESSED CROSSLINKED POLYAMIDE (POLYMER 2)

| RUN NO. | WATER UPTAKE (%) | EXTRACTABLE (%) |
|---|---|---|
| 1 | 17.0 | 1.5 |
| 2 | 17.6 | 1.5 |
| 3 | 17.8 | 1.2 |

[1]140° C at 5000 psi for 5 minutes.

B. MECHANICAL PROPERTIES — Description of Tests.

Basic tensile properties (moldulus of elasticity, tensile strength, elongation) were determined in the wet and dry state on hot pressed dog-bone shaped specimens on an Instron Model 1130. The "dog bone" shaped prescribed for mechanical strength tests on non-rigid plastics according to ASTM procedure (Part 27 Test D638) was modified. Since it is difficult to cut hydrophilic materials free of visible imperfections, a modified specimen was employed.

The template used ot determine the mechanical properties was a rectangle 44 mm by 9.5 mm. At the mid portion of both longitudinal sides there was cut away an arc of a circle having a radius of 12.7 mm. The chord of the portions cut away was −1.8 mm and the lateral distance between the deepest point cut away in both arcs was 4.2 mm to give the characteristic dog bone configuration.

The samples were cut using a scalpel to trace the outline of a template. The construction was made using a No. 9, ⅛ inch diameter, cork borer. This technique of cutting the swollen samples insures a reproduceable specimen. In order to eliminate any possible problem of residual monomers acting as plasticizers, the materials were leached in soxhlet extractors until the residual lactone could not be detected in the leach solution.

The samples in the wet state were designed to test the effect of hydration in water at different salt levels, and pH conditions.

1. The modulus of elasticity is a function of the degrees of hydration of the material as shown below.

| WATER UPTAKE | MODULUS OF ELASTICITY PSI |
|---|---|
| 16.5 | 620 |
| 17.5 | 570 |
| 17.4 | 598 |
| 18.6 | 540 |
| 19.9 | 520 |

2. The mechanical properties were only slightly affected by pH. The tensile modulus only changed from 570 lbs./sq in. (psi) to 540 psi as the pH varied from four to eight; the tensile strength only increased from 330 to 340 over this same pH range as shown in Table XI.

TABLE XI
EFFECT OF pH ON THE MECHANICAL PROPERTIES OF THE HEAT PRESSED CROSSLINKED POLYAMIDE POLYMER 2

| pH | MODULUS OF ELASTICITY (psi) | TENSILE STRENGTH (psi) | ULTIMATE ELONGATION |
|---|---|---|---|
| 4 | 570 | 330 | 240 |
| 7.4 | 591 | 307 | 230 |
| 8.0 | 540 | 340 | 300 |

3. The mechanical properties are only slightly affected by salt content as can be seen from Table XII.

TABLE XII
EFFECT OF SALT CONTENT ON THE MECHANICAL PROPERTIES OF HEAT PRESSED CROSSLINKED POLYAMIDE POLYMER 2

| SALT LEVEL | MODULUS OF ELASTICITY | TENSILE STRENGTH (psi) | ULTIMATE ELONGATION |
|---|---|---|---|
| 0.0 | 520 | 416 | 326 |
| 3.5% | 620 | 384 | 281 |

As a result of the inverse relationship between water uptake and salt content, the tensile strength and elongation decreased as the salt content varied from zero to 3.5% salt. The modulus only increased from 520 psi to 620 psi over this salt level range.

4. The mechanical properties for the dry material are comparable to the properties of Medical Grade Silastic (Dow Corning No. 500-3) as shown in the following Table XIII.

TABLE XIII
MECHANICAL PROPERTIES OF SILASTIC AND HEAT PRESSED POLYMER 2

|  | TENSILE STRENGTH | MODULUS | ELONGATION |
|---|---|---|---|
| Silastic © | 1200 psi | 334 psi | 450% |

TABLE XIII-continued
MECHANICAL PROPERTIES OF SILASTIC AND HEAT PRESSED POLYMER 2

|  | TENSILE STRENGTH | MODULUS | ELONGATION |
|---|---|---|---|
| (dry) Polymer 2 | 2571 psi | 1607 psi | 440% |
| (hydrated) Polymer 2 | 415 psi | 520 psi | 326% |

ULTRAVIOLET SPECTROSCOPY — Polymer 1 and Polymer 2 were leached in aqueous solutions (deionized water and Normosol), methanol, and mixed methanol/ether solvents. Normosol is a solution that simulates the composition and pH (7.4) of plasma. The ratio of polymer to extraction solution was one part of the polymer (crude and heat pressed) for nine parts of solution. The ultraviolet spectra of the extractants were determined in the range of 300–200 millimicrons.

The spectroscopic analysis showed the following:

1. Heat pressing the samples (up to 180° C) into films or tubes did not modify the infrared spectra of this crosslinked polyamide (Polymer 2) or uncrosslinked polyamide (Polymer 1). Thus, the temperature and pressure of compression molding did not affect the chemical structure of Polymer 1 or Polymer 2.

2. The extractables are essentially composed of the lactone. The presence of residual lactone monomer can be seen in the infrared curves of the crosslinked and uncrosslinked polymer: The lactone has a characteristic ester absorption at 1790. This peak appears in both crosslinked and uncrosslinked polymers. In addition, thermographs showed that the source of extractables was the lactone.

3. Thermal processing does not appear to change the amounts of extractables in solution of Polymer 1 and Polymer 2, as shown in Table XIV.

TABLE XIV
EFFECT OF HEAT PRESSING ON THE LEVEL OF EXTRACTABLES IN AQUEOUS SOLUTION OF THE CROSSLINKED (POLYMER 2) AND UNCROSSLINKED POLYAMIDE (POLYMER 1)

| HEAT PRESSED | SAMPLE | PEAK mu | LACTONE LEVEL IN SOLUTION, ppm |
|---|---|---|---|
| No | Polymer 1 | 216 | 3700 |
| Yes | Polymer 1 | 214 | 3500 |
| No | Polymer 2 | 226 | 12,400 |
| Yes | Polymer 2 | 228 | 13,200 |

4. Three 24 hour leaching cycles with Polymer 1 lowered the lactone level in solution from 3500 ppm to 900 ppm of leaching solution.

5. Three 24 hours leaching cycles with Polymer 2 lowered the residual monomer level in solution from 10,000 ppm to 200 ppm as shown in Table IV.

TABLE XV
EFFECT OF LEACHING CYCLES ON THE LEVEL OF EXTRACTABLES OF POLYMER 1 AND POLYMER 2 (BOTH WITHOUT COMPRESSION MOLDING)

UNCROSSLINKED (POLYMER 1)

| LEACH NO. | SOLVENT | PEAK mu | LACTONE LEVEL IN SOLUTION, ppm |
|---|---|---|---|
| 1 | Deionized Water | 214 | 3500 |
| 2 | Deionized Water | 208 | 1500 |
| 3 | Deionized Water | 206 | 900 |
| 1 | Normosol | 223 | 3500 |
| 3 | Normosol | 223 | 900 |

CROSSLINKED (POLYMER 2)

| 1 | Deionized Water | 226 | 12,400 |
| 2 | Deionized Water | 213 | 4,800 |
| 3 | Deionized Water | 210 | 2,000 |
| 1 | Normosol | 228 | 10,000 |
| 3 | Normosol | 222 | 1,400 |

The difference between the original concentrations of monomer in solution (Polymer 1 = 3500 ppm, Polymer 2 = 10,000 ppm) can be explained by the high temperature 595° C used to crosslink the polyamide (Polymer 2). This elevated temperature accelerates the kinetics of leaching. Thus, more lactone is found in the solution. This type of behavior was observed with poly(HEMA) samples, where the amount of residual monomer in the leaching solution increased on autoclaving. 6. A 72 hour soxhlet extraction of the heat pressed crosslinked polyamide (Polymer 2) lowered the lactone content to below an undetactable level (<5 ppm).

DIFFUSION — Description. The permeability of oxygen and sodium chloride was determined in order to provide basic data on the diffusion properties of the samples compared to poly(HEMA) and other existing biomaterials. Oxygen permeability was measured using an IBC differential Oxygen Analyzer. The sodium chloride permeability was determined utilizing a dialysis cell.

RESULT — The results were typical of a hydrogel of low hydrophilicity. The oxygen permeability of 0.9 $\times$ $10^{-10}$ $CM^3$ STP (cm)/ $cm^2$ -sec(cmHg) is more than five times lower than that observed for a crosslinked poly(HEMA) (Water uptake= 60%). The permeability coefficient of sodium chloride (0.2 $\times$ $10^{-7}$ $cm^2$/sec) is 10 times lower than reported for a PHEMA membrane, Spacek et al, 2. Biomed. Mater. Res. Vol. 7,201(1973) (water uptake — 64%). These lower permeability values are the result of the lower (20 percent) swelling value in comparison with certain HEMA polymers. Yasuda also indicated a direct relationship between permeability of NaCl and hydration for hydrogel systems, ("Diemakromoleulone Chemic", Vol. 118, 19 (1968).

Polymer 1 has good adhesion to glass but relatively poor wet and dry abrasion resistance. The film had very low anti-fog capacity compared to poly(HEMA) (10 times lower than poly[HEMA]). This was due to its relatively low hydrophilicity.

The products of the invention can comprise, consist essentially of or consist of the units set forth and the reactants and reaction conditions can comprise, consist essentially of or consist of those set forth.

What is claimed is:

1. A thermoplastic hydrophilic polymer having hydroxyl groups and capable of forming a hydrogel, said polymer being a condensation product of (1) a spirolactone of the formula:

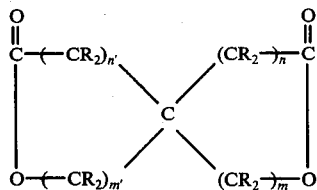

where the total of n and m is 2 to 5 and the total of $n'$ and $m'$ is 2 to 5 and the R groups are H or hydrocarbyl with the proviso that not over 3 R groups are hydrocarbyl with (2) a difunctional compound having two groups capable of opening the lactone ring which groups are selected from the group consisting of primary amino, secondary amino, alcoholic hydroxy and phenolic hydroxyl, (1) and (2) being employed in the range of 0.1 to 1 mole of (1) with 1 to 0.1 mole of (2).

2. A thermoplastic polymer according to claim 1, wherein the groups capable of opening the lactone ring are primary amino groups or secondary amino groups.

3. A thermoplastic polymer according to claim 2 wherein both amino groups are primary amino groups.

4. A thermoplastic polymer according to claim 1 wherein the spirolactone is 4,4-spirobibutyrolactone.

5. A thermoplastic polymer according to claim 4 wherein the groups capable of opening the lactone ring are primary amino groups or secondary amino groups.

6. A thermoplastic polymer according to claim 5 wherein both amino groups are primary amino groups.

7. A crosslinked thermoplastic polymer prepared by crosslinking a thermoplastic hydrophilic polymer having hydroxyl groups and capable of forming a hydrogel, said polymer being a condensation product of (1) a spirolactone of the formula:

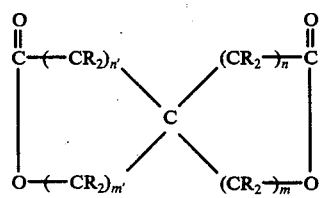

where the total of n and m is to 2 to 5 and the total of $n'$ and $m'$ is 2 to 5 and the R groups are H or hydrocarbyl with the proviso that not over 3 R groups are hydrocarbyl with (2) a difunctional compound capable of opening the lactone ring having two groups capable of opening the lactone ring which groups are selected from the group consisting of primary amino, secondary amino, alcoholic hydroxy and phenolic hydroxyl with a compound containing at least two functional groups capable of reacting with alcoholic hydroxyl groups, the amount of crosslinking agent being insufficient to destroy the hydrogel forming properties of the polymer.

8. A polymer according to claim 7 wherein the crosslinking compound has isocyanato groups, carboxylic acid groups, methylol groups or at least three amino groups selected from the group consisting of primary and secondary amino groups.

9. A crosslinked thermoplastic polymer according to claim 7 wherein the spirolactone is 4,4-spirobibutyrolactone.

10. A crosslinked polymer according to claim 9 wherein the groups capable of opening the lactone ring are primary amino groups or secondary amino groups.

11. A crosslinked polymer according to claim 10 wherein the crosslinking agent has isocyanato groups.

12. A crosslinked polymer according to claim 11 wherein the compound capable of opening the lactone ring is an alkylene diamine having 2 to 18 carbon atoms, xylylene diamine or piperazine.

13. A crosslinked polymer according to claim 12 wherein the diamine is an alkylene diamine having 6 to 12 dicarbon atoms.

14. A crosslinked polymer according to claim 13 wherein the isocyanate is an alkylene diisocyanate or 4,4' -methylenebis (phenylisocyanate).

15. A crosslinked polymer according to claim 14 wherein the diamine is dodecamethylenediamine and the isocyanate is hexamethylenediisocyanate.

16. A crosslinked polymer according to claim 15 reacted with 5 to 10 mol percent of the diisocyanate per molecular unit of the polymer containing two hydroxyl groups.

17. A crosslinked polymer according to claim 16 reacted with 10 mol percent of diisocyanate.

18. A crosslinked polymer according to claim 11 wherein the diisocyanate is used in an amount of 5 to 10 mol percent per molecular unit of the polymer containing two hydroxyl units.

19. A hydrogel including the polymer according to claim 17.

20. A hydrogel including the polymer of claim 11.

21. A hydrogel including the polymer of claim 9.

22. A hydrogel including the polymer of claim 7.

23. A hydrogel of the polymer of claim 6.

24. A hydrogel of the polymer of claim 4.

25. A hydrogel of the polymer of claim 1.

26. A polymer capable of forming a hydrogel, said polymer containing the repeating unit:

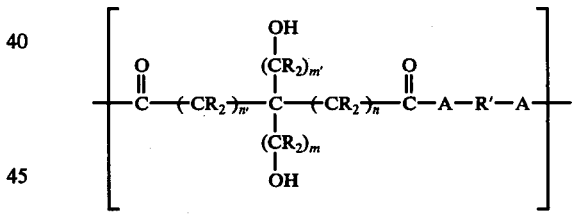

where the R groups are H or hydrocarbyl with the proviso that not over 3 R groups are hydrocarbyl, the total of $n + m$ is 2 to 5, the total of $n' + m'$ is 2 to 5, R' is alkylene, alkylidene, cycloalkylene or arylene, A is —O—, —NH— or

where R' is alkyl, aryl or cycloalkyl and x is the number of units in the polymer.

27. A polymer according to claim 26 wherein all the R groups are hydrogen.

28. A polymer according to claim 27 wherein A is NH of

29. A crosslinked polymer capable of forming a hydrogel, said crosslinked polymer having been prepared by reacting the polymer of claim 27 with a compound containing at least two functional groups capable of reacting with alcoholic hydroxyl groups, the amount of crosslinking agent being insufficient to destroy the hydrogel forming properties of the polymer.

30. A crosslinked polymer according to claim 29 capable of adsorbing at least 20 weight percent of water.

31. A hydrogel of the polymer of claim 30.

32. A polymer containing a:

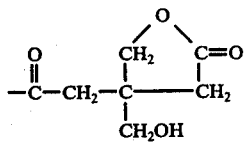

group prepared by heating a polymer according to claim 27 having repeating units of the formula:

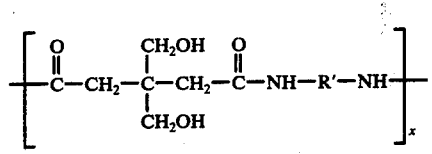

where $x$ is the number of units in the polymer.

33. A polymer according to claim 7 wherein (1) and (2) are employed in the range of 0.1 to 1 mole of (1) with 1 to 0.1 mole of (2).

34. A polymer according to claim 33 wherein (1) and (2) are employed in the mole ratio of 1:1.

35. A hydrogel of a thermoplastic hydrophilic polymer having hydroxyl groups and capable of forming a hydrogel, said polymer being a condensation product of (1) a spirolactone of the formula:

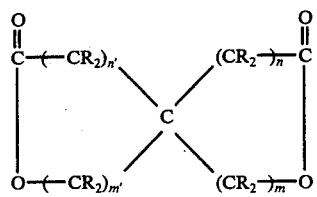

where the total of $n$ and $m$ is 2 to 5 and the total of $n'$ and $m'$ is 2 to 5 and the R groups are H or hydrocarbyl with the proviso that not over 3 R groups are hydrocarbyl with (2) a difunctional compound capable of opening the lactone ring having two groups capable of opening the lactone ring which groups are selected from the group consisting of primary amino, secondary amino, alcoholic hydroxy and phenolic hydroxyl.

36. A hydrogel according to claim 35 wherein the spirolactone is 4,4-spirobibutyrolactone.

37. A hydrogel according to claim 36 wherein the spirolactone and (2) are employed in the mole ratio of 1:1.

38. A hydrogel according to claim 35 wherein (1) and (2) are employed in the mole ratio of 1:1.

39. A polymer according to claim 1 wherein (1) and (2) are employed in the mole ratio of 1:1.

40. A polymer according to claim 39 wherein the spirolactone is 4,4-spirobibutyrolactone.

* * * * *